United States Patent [19]
Larsen et al.

[11] Patent Number: 5,957,493
[45] Date of Patent: Sep. 28, 1999

[54] AIRBAG CHECK VALVE

[75] Inventors: Alan R. Larsen, Layton; Trudy Lewis, Roy, both of Utah

[73] Assignee: Autoliv ASP, Inc., Ogden, Utah

[21] Appl. No.: 08/994,119

[22] Filed: Dec. 19, 1997

[51] Int. Cl.⁶ ................................................. B60R 21/16
[52] U.S. Cl. ................................. 280/743.1; 280/730.2; 280/738
[58] Field of Search ............................. 280/729, 730.2, 280/736, 740, 742, 743.1, 738, 739

[56] References Cited

U.S. PATENT DOCUMENTS

| | | | |
|---|---|---|---|
| 4,004,827 | 1/1977 | Kondo et al. | 280/743.1 |
| 4,004,828 | 1/1977 | Sogabe et al. | 280/743.1 |
| 4,010,055 | 3/1977 | Oka et al. | 280/743.1 |
| 5,211,422 | 5/1993 | Frantz et al. | 280/740 |
| 5,246,250 | 9/1993 | Wolanin et al. | 280/739 |
| 5,273,309 | 12/1993 | Lau et al. | 280/730 A |
| 5,280,953 | 1/1994 | Wolanin et al. | 280/739 |
| 5,364,125 | 11/1994 | Brown et al. | 280/730 A |
| 5,458,366 | 10/1995 | Hock et al. | 280/729 |
| 5,492,363 | 2/1996 | Hartmeyer et al. | 280/739 |
| 5,533,755 | 7/1996 | Nelsen et al. | 280/743.1 |
| 5,542,698 | 8/1996 | Ichino et al. | 280/743.1 |
| 5,615,915 | 4/1997 | Magoteaux | 280/743.1 |
| 5,901,979 | 5/1999 | Schneider et al. | 280/738 |

FOREIGN PATENT DOCUMENTS

| | | |
|---|---|---|
| 5-38993 | 2/1993 | Japan . |
| 5-131889 | 5/1993 | Japan . |
| 6-1191 | 1/1994 | Japan . |

*Primary Examiner*—Christopher P. Ellis
*Assistant Examiner*—Lynda Jasmin
*Attorney, Agent, or Firm*—Ohlandt, Greeley, Ruggiero & Perle, LLP; George W. Rauchfuss

[57] ABSTRACT

A check valve for an airbag cushion assembly permitting inflation gas to be rapidly received into an airbag cushion chamber from an inflation gas source through an inflation gas inlet opening in the fabric of the airbag cushion chamber and preventing flow of inflation gas back through the inflation gas inlet opening comprises a main fabric panel with a plurality of pleatable or foldable fabric tabs extending from a portion of the main fabric panel of the check valve and being non-rupturably secured to the fabric of the airbag cushion chamber.

21 Claims, 4 Drawing Sheets

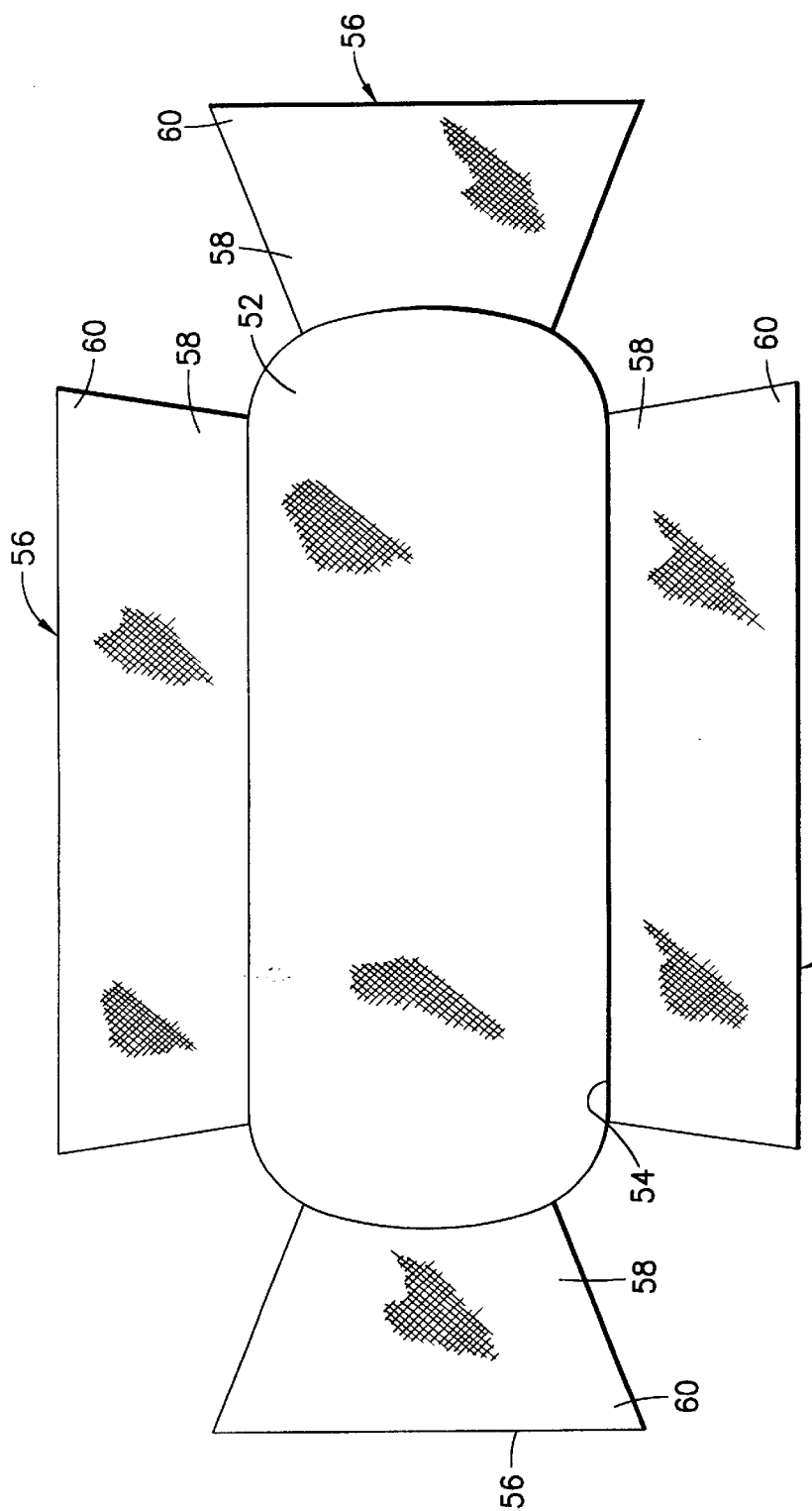
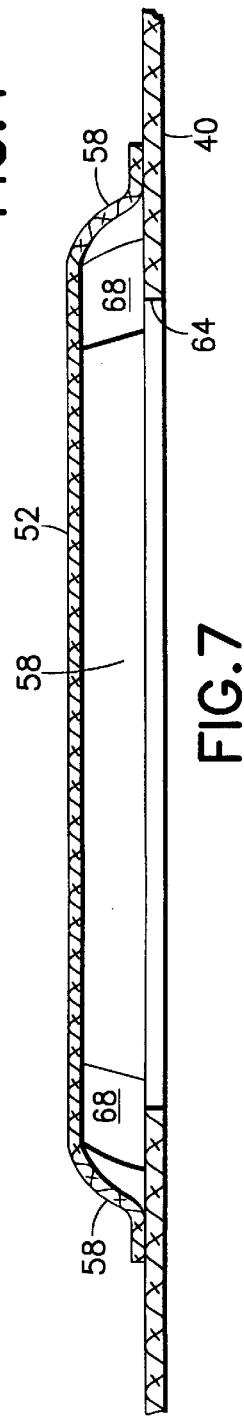

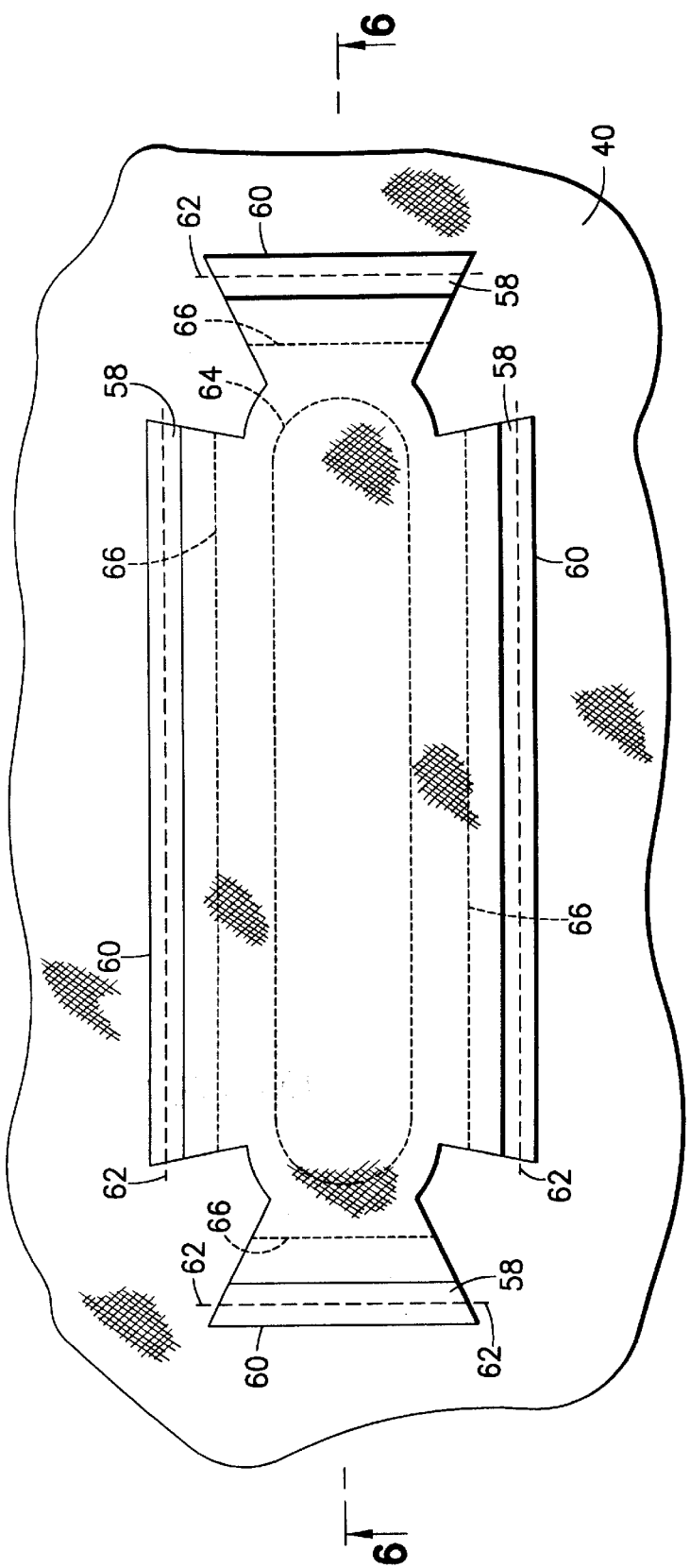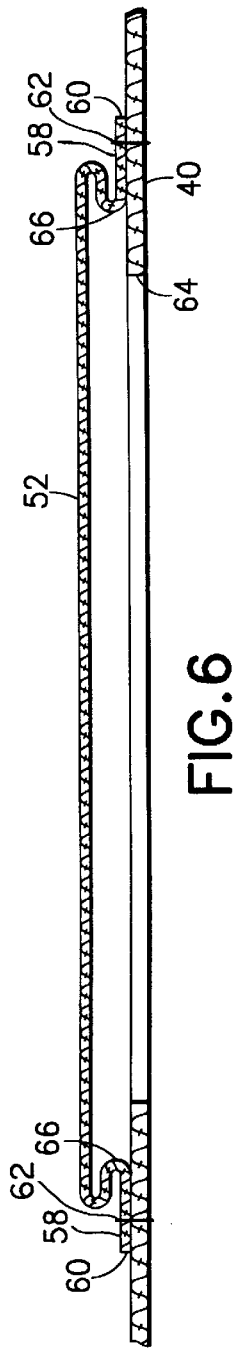
FIG.5
FIG.6

AIRBAG CHECK VALVE

FIELD OF THE INVENTION

This invention relates to an airbag assembly and, more particularly, to an airbag assembly for protecting one or more occupants of a motor vehicle with a single airbag or multiple airbags inflated by a common inflation source and to a check valve for such airbag assembly for preventing flow of inflation gas back through an inflation gas inlet opening in the airbag or airbags. More particularly, the invention relates to such a check valve in a side-impact airbag assembly.

BACKGROUND OF THE INVENTION

An airbag module is part of an inflatable restraint system employed in a vehicle, especially in an automobile, for protecting an occupant against injury. The module deploys an inflated airbag cushion to physically restrain the occupant's body when the vehicle encounters a collision. The airbag module normally includes an inflatable airbag cushion and an inflator that, once triggered by a remote collision sensor, provides inflation gas for inflating the airbag cushion.

As its name implies, a side airbag module protects an occupant against an impact to the side of the vehicle and is normally positioned somewhere between the occupant and the side of the vehicle closest to the occupant. One option for a side airbag module mounting location which has proven advantageous is in the center or "B" pillar of the auto. This location is advantageous because the airbag module is ideally positioned with respect to a front and a rear passenger. In addition, the center pillar is relatively spacious and provides easy access for the airbag module control wiring.

In order to reduce weight and costs, providing a side airbag module that provides protection for both a front and a rear vehicle occupant would be generally preferable over having to provide a separate side airbag module for each occupant. Providing a single side airbag module for protecting both a front and a rear vehicle occupant, however, would generally mean having a single inflator and a relatively large airbag cushion having a front segment for the front occupant and a rear segment for the rear occupant.

One problem with providing a large side airbag cushion is that inflation gas within the fully inflated airbag cushion may be squeezed or transferred from the front segment to the rear segment, or vice versa, if only one occupant strikes the airbag cushion or if the front and rear occupants strike the airbag cushion at different times. Inflation gas permitted to be squeezed out of a segment of the inflated airbag cushion would cause that segment to collapse and not provide the desired protection to an occupant. Such a large side airbag cushion would therefore have to include means for preventing inflation gas from being squeezed or transferred out of the front and rear segments during or after inflation of the airbag cushion.

A similar problem occurs when a single inflation source is employed to inflate a large frontal airbag having a plurality of inflation chambers for protecting one or more occupants of a motor vehicle or when a single inflation source is utilized to inflate at least two airbags.

SUMMARY OF THE INVENTION

A general object, therefore, of the present invention is to provide a new and improved airbag and airbag module.

A more particular object of the present invention is to provide an airbag module that will simultaneously protect two occupants of a vehicle, especially an airbag module that will simultaneously provide protection for both a front and a rear occupant. An additional object of the present invention is to provide an airbag cushion having a first segment for a first occupant of a vehicle and a second segment for a second occupant of a vehicle, and more particularly having a front segment for a front passenger and a rear segment for a rear passenger and having means for preventing inflation gas from being squeezed between the two segments, or between the front and rear segments.

More particularly, an object of this invention is to provide a check valve in such an airbag cushion assembly that permits inflation gas to be rapidly received into the airbag cushion from an inflation gas source through an inflation gas inlet opening in the airbag and for preventing flow of inflation gas back through the inflation gas inlet opening.

The invention comprises an inflatable airbag cushion for inflation to protect at least one occupant of a vehicle, the airbag cushion having an inflation gas inlet opening of a defined area in a panel of said airbag cushion and a check valve for permitting inflation gas to be received into the airbag cushion from inflation gas source through the inflation gas inlet opening and for preventing flow of inflation gas back through said inflation gas inlet opening. The said check valve comprises an essentially gas impermeable main fabric panel located internally on the panel of said airbag cushion and overlaying the inflation gas inlet opening, the main fabric panel having a periphery encompassing an area greater than the area defined by the inflation gas inlet opening for completely closing off the inflation gas inlet opening when overlaying the inflation gas inlet opening and being in contact with the panel of the airbag cushion.

The periphery of the main fabric panel of the check valve has a plurality of fabric tabs extending radially outwardly from a portion of the periphery of the main fabric panel through an intermediate tab portion to a distal end portion; the distal end portion of each of the plurality of fabric tabs being non-rupturably secured to the panel of the airbag cushion around and radially outwardly from the inflation gas inlet opening. The intermediate tab portion of each of the plurality of fabric tabs comprises a pleatable fabric portion for permitting the main fabric panel of the check valve to move between a first position wherein the intermediate tab portion of each fabric tab is pleated and the main fabric panel overlays and closes the inflation gas inlet opening and, a second position wherein the intermediate tab portion of each fabric tab is unpleated and extended such that the main fabric panel is spaced apart from the inflation gas inlet opening wherein a plurality of valve outlets are defined between the extended intermediate tab portions of the valve to permit inflation gas to enter the inflatable airbag cushion through the inflation gas inlet opening and the plurality of valve outlets.

In a preferred embodiment of the invention the periphery of the main fabric panel encompasses an area at least about 10% greater than the area defined by the inflation gas inlet opening in the airbag panel. Also, the plurality of valve outlets define, between the extended tab portions of a total valve outlet area such that the ratio of total valve outlet area to the area defined by the periphery of the inflation gas inlet opening is about 0.3.

In one embodiment of the invention the main fabric panel of the check valve has a generally longitudinally extended oval shape and the fabric tabs extending from the periphery thereof each have a generally trapezoidal shape and the distal ends of each of the plurality of fabric tabs is non-rupturably secured to the panel of the airbag cushion by stitching.

One embodiment of the invention comprises a side-impact airbag cushion assembly wherein the airbag cushion has a first airbag chamber deployable forwardly in the vehicle and a second airbag chamber deployable rearwardly in the vehicle, the two chambers being connected to a common inflation gas source and with there being first and second check valves of the invention overlaying inflation gas inlet openings in the airbag panel of the first and second airbag chambers.

The intermediate tab portion of each fabric tab of the check valves is pleatable or foldable to permit the main fabric panel of each check valve to move between the first position wherein the main fabric panel of the valve overlays and closes the inflation gas inlet opening and the second position wherein the main fabric panel of the valve is spaced apart from the inflation gas inlet opening to define a plurality of valve outlets between the extended intermediate tab portions of the valve.

A further embodiment of the invention comprises a frontal airbag cushion assembly with two such airbag chambers and check valves therefor.

As used herein the term airbag chambers can refer to individual chambers of a single airbag or to chambers of two airbags.

BRIEF DESCRIPTION OF THE DRAWINGS

The invention together with further objects, features, advantages and aspects thereof, will be more clearly understood from the following description taken in connection with the accompanying drawings which illustrate but do not limit the scope of the invention.

FIG. 4 is an enlarged plan view of a check valve of the invention before attachment to the panel of an airbag chamber;

FIG. 5 is a partial plan view of the check valve sewn to the fabric panel of the airbag;

FIG. 6 is a cross-sectional view taken along line 6—6 of FIG. 5; and

FIG. 7 is a cross-sectional view of the check valve of FIGS. 5 and 6 during inflation of the airbag chamber.

The same reference numerals refer to the same elements throughout the various figures.

DETAILED DESCRIPTION OF THE INVENTION

Figure 1:
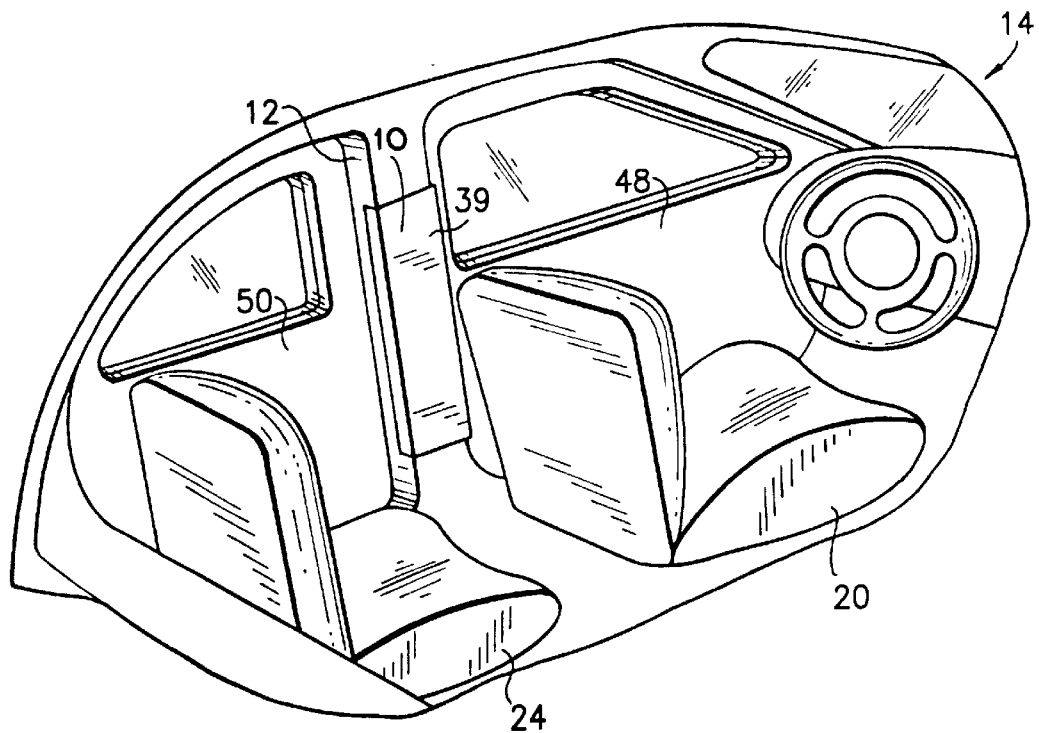
FIG. 1 is a perspective view of an automobile interior having a side airbag module according to the present invention mounted therein.
Figure 2:
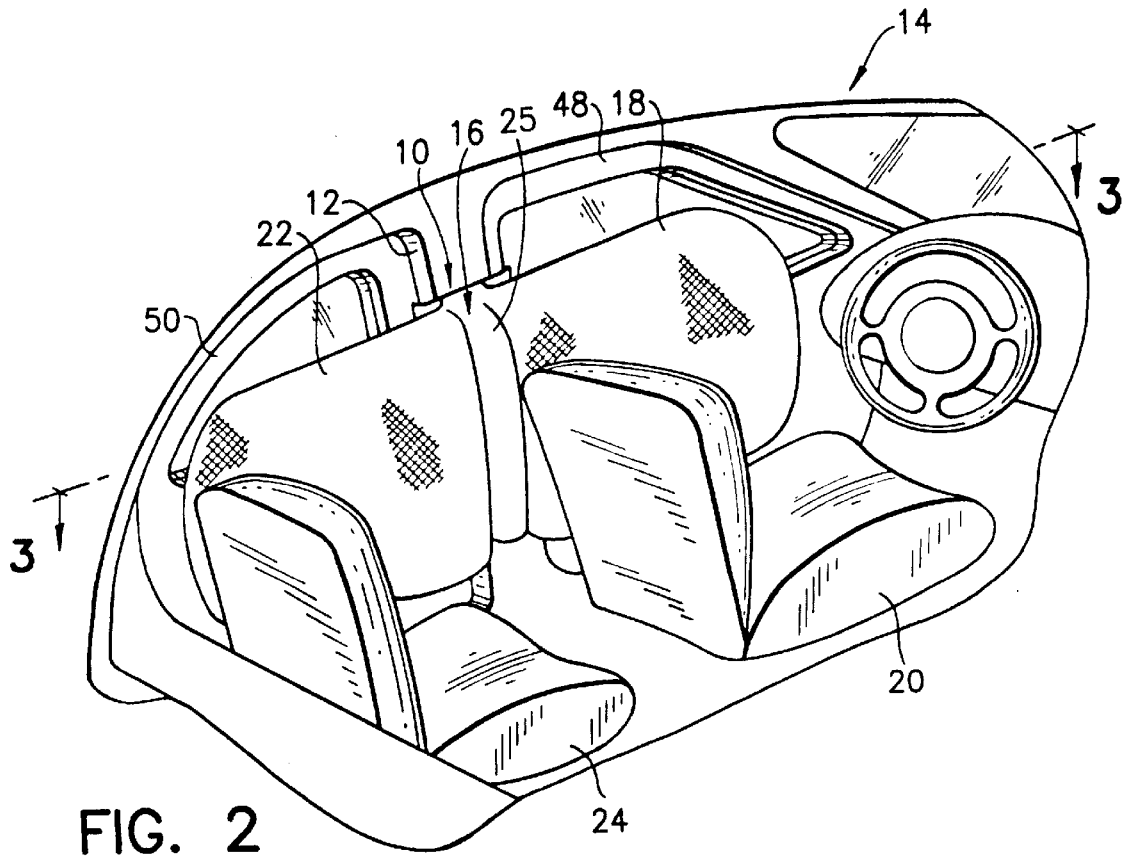
FIG. 2 is a partial perspective view of the automobile interior of FIG. 1 having an airbag cushion deployed from the side airbag module according to the present invention.
Figure 3:
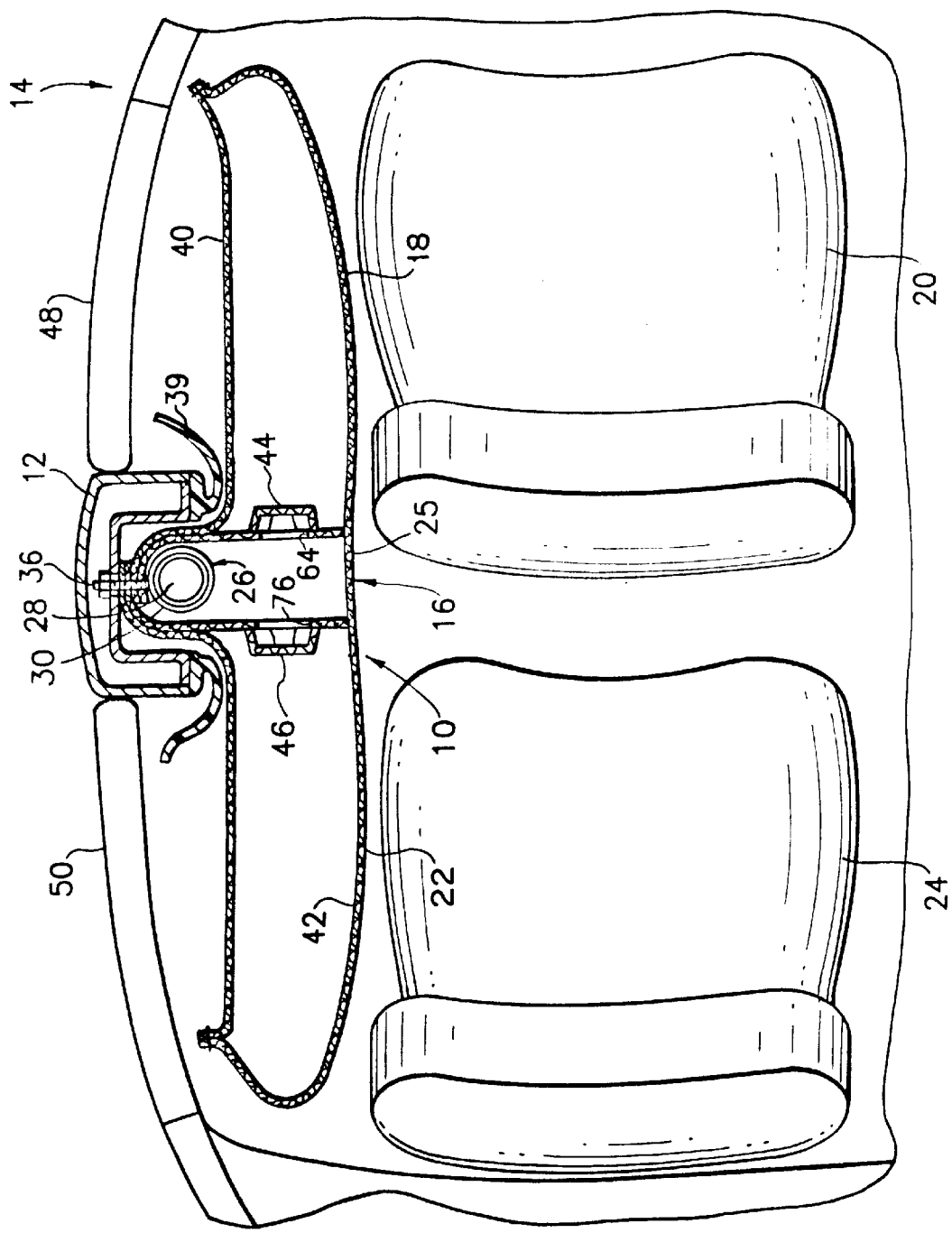
FIG. 3 is a sectional view of the side airbag module of FIG. 2 taken along the line 3—3 of FIG. 2.

Referring generally to FIGS. 1 through 3, the present invention is a side airbag module 10 adapted to mount within a central pillar 12 (or "B" pillar) of a vehicle 14, preferably an automobile. As shown in FIGS. 2 and 3, the side airbag module 10 provides the benefit of deploying a single airbag cushion 16 having a first or front chamber segment 18 for protecting an occupant in a front seat 20 of the vehicle 14 and a second or rear chamber segment 22 for protecting an occupant in a rear seat 24.

In addition to the airbag cushion 16, the side airbag module 10 includes an intermediate chamber 25 between the first and second chambers 18 and 22. In the intermediate chamber 25 is an inflator assembly 26 having an elongated cylindrical inflator 28 and a tubular mounting sleeve 30. The inflator 28 provides inflation gas, which exits inflation exhaust ports (not shown) defined by the inflator, for inflating the airbag cushion 16 upon a signal from a remote deceleration or collision sensor (not shown). The tubular mounting sleeve 30 receives the cylindrical inflator 28 and is crimped around the inflator to secure the mounting sleeve to the inflator. A plurality, generally two, fasteners 36 extend from the mounting sleeve 30 for mounting the side airbag module 10 within the central pillar 12 of the vehicle 14. The side airbag module 14 also includes a rupturable or movable module cover 39 enclosing the airbag cushion 16 and the inflator assembly 26 within the central pillar 12.

The fabric 40 defining front airbag chamber 18 has an inflation gas inlet opening 64 and fabric panel 42 defining rear airbag chamber 22 has an inflator gas inlet opening 76 for receiving inflation gas from inflator 28 through intermediate chamber 25 to protect occupants (not shown) of front seat 20 and rear seat 24 from impacting front door 48 and rear door 50 of vehicle 14 in the event of a side impact collision.

Associated with gas inlet openings 64 and 76 are check valves 44 and 46, respectively (FIG. 3). Each of the check valves are essentially identical. For simplicity purposes only one of the check valves 44 is illustrated further in FIGS. 4 to 7.

The check valve comprises an essentially gas impermeable main fabric panel 52. The periphery 54 of the main fabric panel encompasses an area greater than the area defined by the inflation gas inlet opening 64 with which it is associated so that the main fabric panel can overlay the inflation gas inlet opening for completely closing off the opening when overlaying the opening and being in contact with the panel 40 of the airbag chamber 18 in which the opening is located.

Extending radially outwardly from a portion of the periphery 54 of the main fabric panel 52 of the check valve 44 are a plurality of spaced fabric tabs 56. Each of tabs 56 extends outwardly from periphery 54 through an intermediate tab portion 58 to a distal end portion 60. The intermediate tab portion 58 of each fabric tab 56 comprises a pleatable or foldable fabric portion (FIGS. 5 and 6). The distal end 60 of each tab is non-rupturably secured to the fabric panel 40 of the airbag, such as by non-rupturable stitching 62. After the distal ends 60 have been stitched to the airbag panel, intermediate tab portions 58 of the tabs 56 are folded or pleated along pleat or fold lines 66 to form folds or pleats in the intermediate tab portions so that the main fabric panel 52 overlays and closes off the inflation gas inlet opening 44.

Between each of spaced fabric tabs 56 is a valve outlet opening 68 that functions to permit inflation gas to enter the airbag chamber 18 through inflation inlet opening 64 upon activation of inflator 28. Upon activation of inflator 28, the folds or pleats in tabs 56 unfold or unpleat and permit extension of intermediate tab portions 58 so that the main fabric panel 52 of the check valve 44 rises off and becomes spaced apart from panel 40 of the airbag chamber 18 permitting inflation gases to flow into the airbag chamber through the valve outlets 68 (FIG. 7) from inflation gas inlet opening 64.

It will be appreciated that the inflation gas inlet openings and check valve main panels and tabs can be of any appropriate shape with the area defined by the periphery of the main fabric panel capable of covering the inflation gas inlet openings and being at least about 10% greater than the area defined by the inflation gas inlet opening. However, preferably the shape of the main fabric panel and inflator gas inlet opening is that of a generally longitudinally extended oval shape and the fabric tabs are generally trapezoidal in shape.

Also, for suitable inflation it is preferred that the total valve outlet area defined between the extended intermediate tab portions 58 be such that the ratio thereof to the area defined by the periphery of the inflator gas inlet opening is about 0.3. However other suitable area ratio may be employed.

Once the airbag chamber has become inflated, if an occupant strikes one of the inflated airbag chambers to increased pressure in the struck chamber over the pressure of the incoming inflation gas, the pleatable intermediate tab portions 58 of the check valve 44 again pleat or fold permitting the main fabric panel 52 to collapse back into the airbag panel 40 again closing off inflation gas inlet opening 64 to prevent inflation gases from flow back through the inflation gas inlet opening to the other airbag or airbag chamber.

It will be appreciated that although the airbag module and cushion therefor have been illustrated in the Figures as a side airbag module and side airbag, a similarly constructed airbag module and airbag could be employed elsewhere in the vehicle to protect both first and second occupants of the vehicle. Such an airbag could be mounted in the front of a vehicle in the area of the instrument panel or dashboard to protect both center and passenger side occupants of the front seat of a vehicle, or deployed in a lower area under the instrument panel to provide knee bolster protection for both the vehicle driver and passenger.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. In an inflatable airbag cushion for inflation to protect at least one occupant of a vehicle, said airbag cushion having an inflation gas inlet opening of a defined area in a panel of said airbag cushion and a check valve for permitting inflation gas to be received into said airbag cushion from an inflation gas source through the inflation gas inlet opening and for preventing flow of inflation gas back through said inflation gas inlet opening, the improvement wherein said check valve comprises:

an essentially gas impermeable main fabric panel located internally on the panel of said airbag cushion and overlaying said inflation gas inlet opening, said main fabric panel having a periphery encompassing an area greater than the area defined by the inflation gas inlet opening for completely closing off said inflation gas inlet opening when overlaying said inflation gas inlet opening and being in contact with the panel of the airbag cushion;

the periphery of said main fabric panel having a plurality of fabric tabs extending radially outwardly from a portion of said periphery of said main fabric panel through an intermediate tab portion to a distal end portion; the distal end portion of each of said plurality of fabric tabs non-rupturably secured to the panel of the airbag cushion around and radially outwardly from the inflation gas inlet opening; the intermediate tab portion of each of said plurality of fabric tabs comprising a pleatable fabric portion for permitting the main fabric panel of the check valve to move between a first position wherein the intermediate tab portion of each fabric tab is pleated and the main fabric panel overlays and closes the inflation gas inlet opening and, a second position wherein the intermediate tab portion of said each fabric tab is unpleated and extended such that the main fabric panel is spaced apart from the inflation gas inlet opening wherein a plurality of valve outlets are defined between the extended intermediate tab portions of said valve to permit inflation gas to enter the inflatable airbag cushion through the inflation gas inlet opening and the plurality of valve outlets.

2. An inflatable airbag cushion according to claim 1 wherein the periphery of the main fabric panel encompasses an area at least about 10% greater than the area defined by the inflation gas inlet opening.

3. An inflatable airbag cushion according to claim 1 wherein the plurality of valve outlets define, between the extended intermediate tab portions, a total valve outlet area such that a ratio of total valve outlet area to the area defined by the periphery of the inflation gas inlet opening is about 0.3.

4. An inflatable airbag cushion according to claim 1 wherein the main fabric panel of the check valve has a generally longitudinally extended oval shape and the fabric tabs extending from the periphery thereof each having a generally trapezoidal shape.

5. An inflatable airbag cushion according to claim 1 wherein the distal end portion of each of said plurality of fabric tabs is non-rupturably secured to the panel of the airbag cushion by stitching.

6. The inflatable airbag cushion according to claim 1 wherein the airbag cushion comprises an inflatable side-impact airbag cushion assembly having a first airbag chamber deployable forwardly in said vehicle and a second airbag chamber deployable rearwardly in said vehicle, said first and second airbag chambers, respectively, connected to a common inflation gas source through a first inflation gas inlet opening in a panel of said first airbag chamber and a second inflation gas inlet opening in a panel of said second airbag chamber, a first check valve overlaying the first inflation gas inlet opening of said first airbag chamber and a second check valve overlaying the second inflation gas inlet opening of said second airbag chamber.

7. The inflatable side-impact airbag cushion assembly according to claim 6 wherein the periphery of the main fabric of each check valve panel encompasses an area at least about 10% greater than the area defined by the inflation gas inlet opening associated with the respective check valve.

8. An inflatable side-impact airbag cushion assembly according to claim 6 wherein the plurality of valve outlets defined between the extended intermediate tab portions of each check valve comprise a total valve outlet area such that a ratio of total valve outlet area to the area defined by the periphery of the inflation gas inlet opening associated with the respective check valve is about 0.3.

9. An inflatable side-impact airbag cushion assembly according to claim 6 wherein the main fabric panel of each of the check valves has a generally longitudinally extended oval shape and the fabric tabs extending from the periphery thereof each having a generally trapezoidal shape.

10. An inflatable side-impact airbag cushion assembly according to claim 6 wherein the distal end portion of each of said plurality of fabric tabs of said first end and second check valves is non-rupturably secured to the panel of the airbag chamber associated with the respective check valve by stitching.

11. An inflatable airbag cushion assembly for inflation to protect one or more occupants of a vehicle, said airbag cushion assembly having a first airbag chamber deployable in a front direction in the vehicle and a second airbag chamber deployable in a second direction in said vehicle, said first and second airbag chambers connected to a common inflation gas source by first and second inflation gas inlet openings in a panel of said respective chambers; said first and second inflation gas inlet openings defining first and second areas, respectively;

first and second check valves for permitting inflation gas to be received into said first and second airbag chambers, respectively, from the common inflation gas source through the inflation gas inlet openings and for preventing flow of inflation gas back through said inflation gas inlet openings;

said first check valve comprising:
an essentially gas impermeable main fabric panel located internally on a panel of said first airbag chamber and overlaying said first inflation gas inlet opening, said main fabric panel of said first check valve having a periphery encompassing an area greater than the area defined by the first inflation gas inlet opening for completely closing said first inflation gas inlet opening when overlaying said first inflation gas inlet opening and being in contact with the panel of the first airbag chamber;

the periphery of said main fabric panel of said first check valve having a plurality of fabric tabs extending radially outwardly from a portion of said periphery of said main fabric panel through an intermediate tab portion to a distal end portion; the distal end portion of each of said plurality of fabric tabs non-rupturably secured to the panel of the first airbag chamber around and radially outwardly from the first inflation gas inlet opening; the intermediate tab portion of each of said plurality of fabric tabs comprising a pleatable fabric portion for permitting the main fabric panel of the first check valve to move between a first position wherein the intermediate tab portion of each fabric tab is pleated and the main fabric panel overlays and closes the first inflation gas inlet opening and, a second position wherein the intermediate tab portion of said each fabric tab is unpleated and extended such that the main fabric panel is spaced apart from the first inflation gas inlet opening wherein a plurality of first valve outlets are defined between the extended intermediate tab portions of said first valve to permit inflation gas to enter the first airbag chamber of the inflatable airbag cushion through the first inflation gas inlet opening and the plurality of first valve outlets; and said second check valve comprising:
an essentially gas impermeable main fabric panel located internally on a panel of said second airbag chamber and overlaying said second inflation gas inlet opening, said main fabric panel of said second check valve having a periphery encompassing an area greater than the area defined by the second inflation gas inlet opening for completely closing said second inflation gas inlet opening when overlaying said second inflation gas inlet opening and being in contact with the panel of said second airbag chamber;

the periphery of said main fabric panel of said second check valve having a plurality of fabric tabs extending radially outwardly from a portion of said periphery of said main fabric panel through an intermediate tab portion to a distal end portion; the distal end portion of each of said plurality of fabric tabs non-rupturably secured to the panel of the second airbag chamber around and radially outwardly from the second inflation gas inlet opening; the intermediate tab portion of each of said plurality of fabric tabs comprising a pleatable fabric portion for permitting the main fabric panel of the second check valve to move between a second position wherein the intermediate tab portion of each fabric tab is pleated and the main fabric panel overlays and closes the second inflation gas inlet opening and, a second position wherein the intermediate tab portion of said each fabric tab is unpleated and extended such that the main fabric panel is spaced apart from the second inflation gas inlet opening wherein a plurality of second valve outlets are defined between the extended intermediate tab portions of said second valve to permit inflation gas to enter the second airbag chamber of the inflatable airbag cushion through the second inflation gas inlet opening and the plurality of second valve outlets.

12. An inflatable airbag cushion assembly according to claim 11 wherein the periphery of the main fabric panel of each of the first and second check valves encompasses an area about 10% greater than the area defined by the first and second inflation gas inlet openings, respectively.

13. An inflatable airbag cushion assembly according to claim 12 wherein said airbag cushion assembly is a side-impact airbag cushion assembly and the first airbag chamber is deployable forwardly in the vehicle and the second airbag cushion chamber is deployable rearwardly in said vehicle.

14. An inflatable airbag cushion assembly according to claim 11 wherein the plurality of valve outlets of each of said first and second check valves, respectively, define, between their respective extended intermediate tab portions, a first and second total valve outlet area such that a ratio of said first total valve outlet area to the area defined by the periphery of the first inflation gas inlet opening is about 0.3 and a ratio of said second total valve outlet area to the area defined by the periphery of the second inflation gas inlet opening is about 0.3.

15. An inflatable airbag cushion assembly according to claim 14 wherein said airbag cushion assembly is a side-impact airbag cushion assembly and the first airbag chamber is deployable forwardly in the vehicle and the second airbag cushion chamber is deployable rearwardly in said vehicle.

16. An inflatable airbag cushion assembly according to claim 11 wherein the main fabric panels of the first and second check valves each have a generally longitudinally extended oval shape and the fabric tabs extending from the peripheries thereof each having a generally trapezoidal shape.

17. An inflatable airbag cushion assembly according to claim 13 wherein said airbag cushion assembly is a side-impact airbag cushion assembly and the first airbag chamber is deployable forwardly in the vehicle and the second airbag cushion chamber is deployable rearwardly in said vehicle.

18. An inflatable airbag cushion assembly according to claim 11 wherein the distal end portion of each of said plurality of fabric tabs of said first end and second check valves is non-rupturably secured to the panel of the airbag chamber associated with their respective check valve.

19. An inflatable airbag cushion assembly according to claim 18 wherein said airbag cushion assembly is a side-impact airbag cushion assembly and the first airbag chamber is deployable forwardly in the vehicle and the second airbag cushion chamber is deployable rearwardly in said vehicle.

20. An inflatable airbag cushion assembly according to claim 11 wherein said airbag cushion assembly is a side-impact airbag cushion assembly and the first airbag chamber is deployable forwardly in the vehicle and the second airbag cushion chamber is deployable rearwardly in said vehicle.

21. An inflatable side-impact airbag cushion assembly for inflation to protect one or more occupants of a vehicle, said airbag cushion having a first airbag chamber deployable forwardly in the vehicle and a second airbag chamber deployable rearwardly in said vehicle, said first and second airbag chambers connected to a common inflation gas source by first and second inflation gas inlet openings in a panel of said respective chambers; said first and second inflation gas inlet openings defining first and second areas, respectively;

first and second check valves for permitting inflation gas to be received into said first and second airbag chambers, respectively, from the inflation gas source through the inflation gas inlet openings and for preventing flow of inflation gas back through said inflation gas inlet openings;

said first check valve comprising:
an essentially gas impermeable main fabric panel located internally on a panel of said first airbag chamber and overlaying said first inflation gas inlet opening, said main fabric panel of said first check valve having a periphery encompassing an area greater than the area defined by the first inflation gas inlet opening for completely closing off said first inflation gas inlet opening when overlaying said first inflation gas inlet opening and being in contact with the panel of the first airbag chamber;

the periphery of said main fabric panel of said first check valve having a plurality of fabric tabs extending radially outwardly from a portion of said periphery of said main fabric panel through an intermediate tab portion to a distal end portion; the distal end portion of each of said plurality of fabric tabs non-rupturably secured to the panel of the first airbag chamber around and radially outwardly from the first inflation gas inlet opening; the intermediate tab portion of each of said plurality of fabric tabs comprising a pleatable fabric portion for permitting the main fabric panel of the first check valve to move between a first position wherein the intermediate tab portion of each fabric tab is pleated and the main fabric panel overlays and closes the first inflation gas inlet opening and, a second position wherein the intermediate tab portion of said each fabric tab is unpleated and extended such that the main fabric panel is spaced apart from the first inflation gas inlet opening wherein a plurality of first valve outlets are defined between the extended intermediate tab portions of said first valve to permit inflation gas to enter the first airbag chamber of the inflatable airbag cushion through the first inflation gas inlet opening and the plurality of first valve outlets; and said second check valve comprising:
an essentially gas impermeable main fabric panel located internally on a panel of said second airbag chamber and overlaying said second inflation gas inlet opening, said main fabric panel of said second check valve having a periphery encompassing an area greater than the area defined by the second inflation gas inlet opening for completely closing said second inflation gas inlet opening when overlaying said second inflation gas inlet opening and being in contact with the panel of said second airbag chamber;

the periphery of said main fabric panel of said second check valve having a plurality of fabric tabs extending radially outwardly from a portion of said periphery of said main fabric panel through an intermediate tab portion to a distal end portion; the distal end portion of each of said plurality of fabric tabs non-rupturably secured to the panel of the second airbag chamber around and radially outwardly from the second inflation gas inlet opening; the intermediate tab portion of each of said plurality of fabric tabs comprising a pleatable fabric portion for permitting the main fabric panel of the second check valve to move between a second position wherein the intermediate tab portion of each fabric tab is pleated and the main fabric panel overlays and closes the second inflation gas inlet opening and, a second position wherein the intermediate tab portion of said each fabric tab is unpleated and extended such that the main fabric panel is spaced apart from the second inflation gas inlet opening wherein a plurality of second valve outlets are defined between the extended intermediate tab portions of said second valve to permit inflation gas to enter the second airbag chamber of the inflatable airbag cushion through the second inflation gas inlet opening and the plurality of second valve outlets;

the periphery of the main fabric panel of each the first and second check valves encompasses an area about 10% greater than the area defined by the first and second inflation gas inlet openings, respectively;

the plurality of valve outlets of each of said first and second check valves, respectively, define, between their respective extended intermediate tab portions, a first and second total valve outlet area such that a ratio of said first total valve outlet area to the area defined by the periphery of the first inflation gas inlet opening is about 0.3 and a ratio of said second total valve outlet area to the area defined by the periphery of the second inflation gas inlet opening is about 0.3;

the main fabric panels of the first and second check valves each have a generally longitudinally extended oval shape and the fabric tabs extending from the peripheries thereof each having a generally trapezoidal shape; and the distal end portion of each of said plurality of fabric tabs of said first end and second check valves non-rupturably secured to the panel of the airbag chamber associated with the respective check valve by stitching.

* * * * *